United States Patent [19]

Cohen

[11] Patent Number: 4,609,813
[45] Date of Patent: Sep. 2, 1986

[54] OPTICAL SYSTEMS EMPLOYING OVATE LIGHT BEAMS

[75] Inventor: Donald K. Cohen, Tucson, Ariz.

[73] Assignee: International Business Machines Corporation, Armonk, N.Y.

[21] Appl. No.: 713,208

[22] Filed: Mar. 18, 1985

[51] Int. Cl.⁴ .............................. G01T 1/20; G11B 5/09
[52] U.S. Cl. ........................................ 250/201; 369/45
[58] Field of Search ................. 250/201 DF, 201 AF, 250/204; 369/44, 45, 46

[56] References Cited

U.S. PATENT DOCUMENTS 4,293,944  10/1981  Izumita et al. ..................... 369/45
4,368,526  1/1983  Harigae et al. .................. 250/201 DF Primary Examiner—Davis L. Willis
Assistant Examiner—William L. Oen
Attorney, Agent, or Firm—H. F. Somermeyer

[57] ABSTRACT

An optical system, preferably used in an optical data recorder, has a laser light source emitting a light beam having an ovate or elliptical cross-section. An astigmatic optical element, such as a hemicylinder or cylindrical lens, disposed at 45 degrees with respect to the major axis, also termed the beam ellipse axis, in front of a focus detector eliminates focus offset errors caused by beam ellipticity.

17 Claims, 2 Drawing Figures

OPTICAL SYSTEMS EMPLOYING OVATE LIGHT BEAMS

BACKGROUND OF THE INVENTION

1. Field of the Invention

The present invention relates to optical systems employing lasers, and more particularly to focusing systems adaptable for use with optical information-bearing signal recorders.

2. Description of the Prior Art

Most optical systems, including optical information-bearing signal recorders, require that the light beam be focused at a predetermined focal point. In optical information-bearing signal recorders, it is required that the laser beam be focused at the recording surface of the optical record member. There are several schemes available for detecting that focus condition which create an error signal suitable for driving an optical system to a desired focus. One scheme for focus detection is to introduce astigmatism into the optical path immediately in front of a focus detector. In such a system, a focus detector usually includes a plurality of closely spaced-apart photodetectors. Quite commonly, a so-called quadrant detector consisting of four photodetectors disposed as a rectangular array is employed. The astigmatism is often introduced through the use of a cylindrical lens mounted at the quadrant detector. The astigmatism causes changes in shape of the beam impinging upon the focus detector in accordance with the direction and degree of out-of-focus condition. Generally, the astigmatic axis of the cylindrical lens is disposed at 45 degrees with respect to the axes of the quadrant detector and a tangential length of a record track being scanned. The below listed U.S. patents are exemplary of such a focus detection system, including disposing a cylindrical lens at 45 degrees with respect to the axes of a quadrant detector: 4,280,215; 4,296,316; 4,163,149; 4,293,944; 4,123,652; 4,290,132; 4,273,998; and 4,287,413.

The precise operation contemplated in astigmatic focusing systems, as above described, contemplates a circularly cross-sectioned light beam. For example, in FIG. 3b of U.S. Pat. No. 4,280,215, the illustrated gas lasers emit circularly cross-sectioned light beams; however, solid-state or semiconductive lasers tend to emit ovate-shaped light beams. Further, such semiconductive lasers emit ovately, cross-sectioned light beams that vary in their respective aspect ratios; that is, the length of the major axis with respect to the length of the minor axis varies from laser to laser. The optical asymmetry associated with an ovately, cross-sectioned-shaped light beam results in offset errors of focus; that is, a somewhat out-of-focus condition will be indicated as being in focus when an ovate-shaped light beam is used in focusing arrangements. As a result, the light beam emitted from solid-state lasers have been made circular in cross-section, apparently to avoid the offset problem. For example, see U.S. Pat. Nos. 4,411,500; 4,235,507; 4,272,651; 4,334,173; 4,397,527, and others. The circularization of an ovate light beam has not always provided a true circle. As a result, some offset errors still occur. While in many optical information-bearing signal recorders a small focus offset error may be acceptable, as optical recorders employ higher and higher areal recording densities such offset errors in focus become unacceptable. Further, the circularization of light beams require higher emitted energy from the laser than without circularization, i.e., many circularization techniques truncate the peripheral energy levels of the light beam during circularization. It is also desired to enable maximal laser energy to be used throughout an optical system, therefore such truncation of energy levels should be avoided.

U.S. Pat. No. 4,464,741 shows a pair of astigmatic lenses disposed at 90 degrees with respect to each other for accommodating asymmetry in the response of the focus detector. That is, in one direction of out-of-focus condition, focus detector could indicate for a given degree of out-of-focus condition different focus error signals. The crossed astigmatic lenses re-establish symmetry. The resulting symmetry apparently results because the images of the pupil of the objective system and its two focal planes are not symmetrical relative to the plane of the detectors. Apparently, this latter system requires precise spacing of the crossed lenses from the detector plane.

Therefore, it is still desired to maximize energy throughput of an optical system by accommodating an ovate-shaped light beam having various varying aspect ratios with a minimal number of optical components. It is desired that the construction of such an optical system be insensitive to precise positioning along the light beam path as well as accommodate ovate light beams having different aspect ratios.

SUMMARY OF THE INVENTION

It is an object of the invention to provide an optical system that maximizes usage of emitted light beams and yet reduce offset errors caused by non-circular, cross-sectionally-shaped beams.

In accordance with the invention, in an optical system, astigmatism along an axis disposed at 45 degrees with respect to an ellipse axis of a light beam being processed by optical elements is introduced into the optical system for removing offset errors introduced by ellipticity of the light beam. In a simple form of the invention, a hemicylinder lens is introduced into the optical system having an ellipse axis disposed at 45 degrees with respect to the astigmatic axis of the light beam being processed in the optical system.

The foregoing and other objects, features, and advantages of the invention will be apparent from the following more particular description of preferred embodiments of the invention, as illustrated in the accompany drawings.

DESCRIPTION OF THE PREFERRED EMBODIMENT

Figure 1:
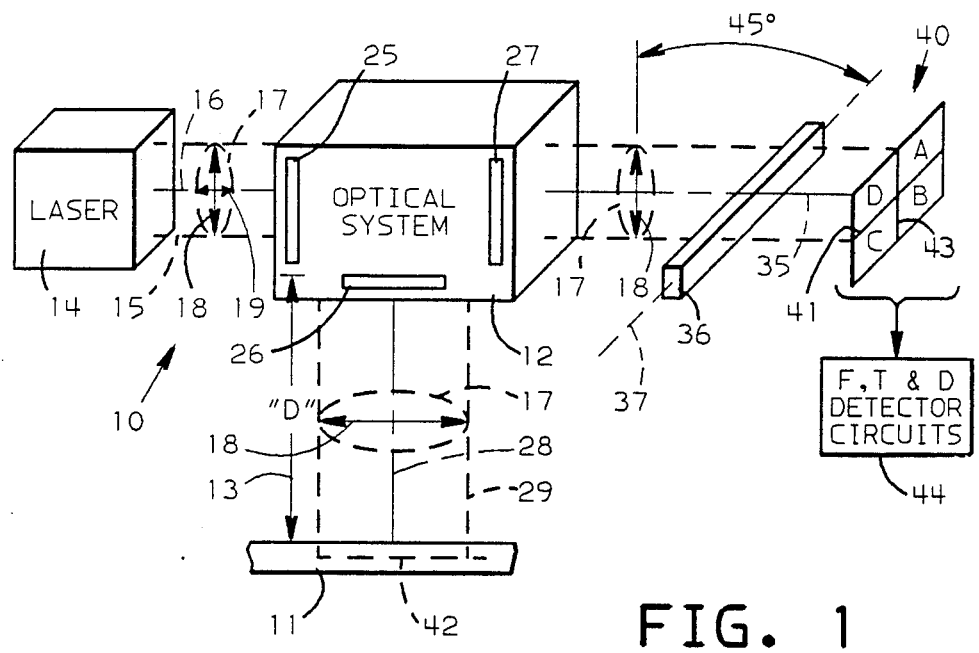
FIG. 1 diagrammatically illustrates an optical data recorder employing the present invention.

Referring now to the drawing, optical information-bearing signal data recorder 10 records optical signals onto and recovers optical signals from optical data record or disk 11. The form of recording on disk 11 can be any optically sensible recording, such as ablative using pits or bubbles, phase change which causes reflectance changes in an active recording layer, surface magneto-optic type, etc. The recording and recovery of optical signals can use any known technique. Numeral 12 diagrammatically represents a head-supporting arm of a disk-type optical signal recording. Such a head arm generally is movable radially with respect to record disk 11, and faces the optical surface of the record disk 11 and spaced from the disk at a distance 13, referred to as the focus distance "D".

A solid-state or semiconductive laser 14 emits an ovate cross-section light beam 17 diagrammatically illustrated at 15 along an axis 16 toward optical system 12. While the shape of the emitted beam may not be a perfect ellipse, for purposes of analysis and for practicing the present invention, the ovate shape 17 has a major axis 18 (also referred to as an ellipse axis) and a minor axis 19. It has been found that by disposing an astigmatic element, later described, at 45 degrees with respect to either the major or minor axes of the ovate-shaped beam 15, that substantially all focus offset errors are accommodated irrespective of the aspect ratio or size of the oval, i.e., the relative length of major axis 18 to the length of minor axis 19. Such an arrangement eliminates the need for precisely calibrating each and every recorder constructed and eliminates the need for changing the shape of the beam from ovate to circular.

Optical system 12 is constructed in the usual manner. It includes a beam splitter 25 optically coupled to an objective lens 26. Splitter 25 and objective lens 26 direct the laser 14 emitted beam 15 to record disk 11 along an axis 28 as an ovate-shaped beam 29. Quarter-wave plate 27 is optically interposed between splitter 25 and objective lens 26 for providing optical isolation between the beam reflected from record disk 11 to optical system 12 and for directing the reflected beam along an optical axis 35 for detecting the focus condition of beam 28 at disk 11. The light beam travelling along axis 35 maintains its ovate shape. In a magneto-optical recorder (not shown), the arrangement of optical elements is substantially different, as is known.

Hemicylinder lens 36, an astigmatic optical element, is disposed symmetrically with respect to axis 35 and has an astigmatic axis 37 disposed at about 45 degrees as measured in a plane (not shown) disposed orthogonally to axis 35 with respect to the major axis 18 of the ovate-shaped beam projected along axis 35. Disposed close to hemicylinder lens 36 is a so-called quad or quadrant detector 40 having four photodetectors A, B, C, and D disposed in a plane orthogonal to axis 35. These four photodetectors can be of any geometric shape. Quad detector 40 includes an axis 41 disposed along track line 42 of a record track (not shown) on record disk 11. In this manner, quad detector 40 can also be used for track following, as is known. Quad detector 40 also includes a minor axis 43. The intersection of axes 41, 43 is aligned with axis 35. Detector circuits 44 are electrically coupled to quad detector 40 in a usual manner for detecting focus, track-following signals, and for detecting data. Of course, separate detectors can be used.

Figure 2:
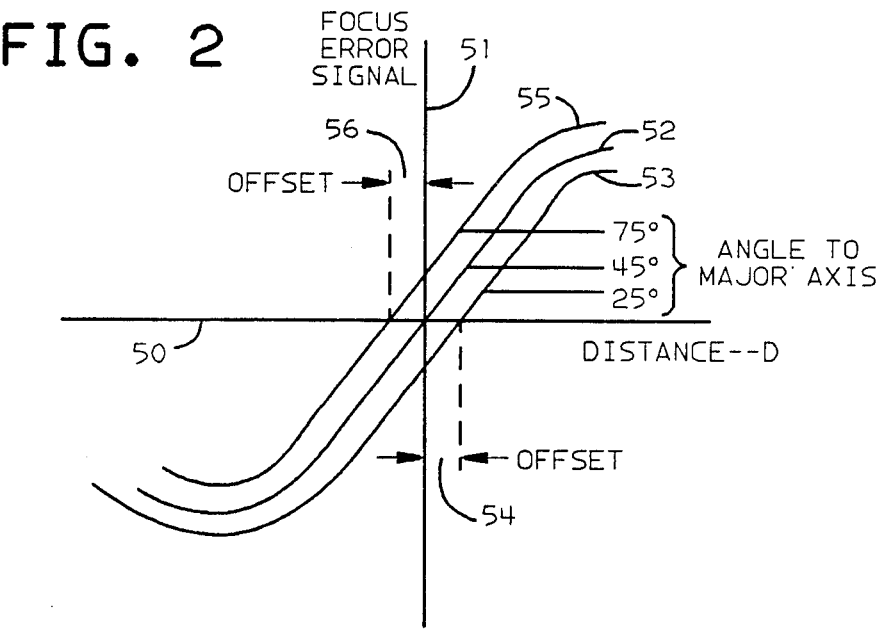
FIG. 2 graphically shows the variations in focus operation of the FIG. 1 illustrated recorder by practicing the present invention.

The operation of the invention is best understood by referring to the graph of FIG. 2. Abscissa 50 represents the distance D between the effective focal center of objective lens 26 and the optical recording surface of record disk 11. Ordinate 51 represents the focus condition representing focus error signal amplitude and polarity. The intersection of the ordinate and the abscissa represent an in-focus condition while points above the abscissa represent focus error signals indicating a too-close, out-of-focus condition, while points below the abscissa represent focus error signals indicating a too far, out-of-focus condition. An ideal focus error curve 52 is disposed symmetrically about the ordinate and abscissa and intersects the ordinate and abscissa at their intersection. When the astigmatic optical element 36 is disposed at 45 degrees with respect to the major axis 18, and hence, the minor axis 19, focus error signals follow curve 52 and as indicated by the numeral 45°. Measurements have shown that when the lens 36 is disposed at 25 degrees with respect to the astigmatic axis 18, curve 53 is generated as the focus error signal. This results in an offset indicated by double-headed arrow 54 such that a false focus condition is indicated. It should be noted that curve 53 corresponds to lens 36 being disposed at 45 degrees with respect to axis 41 of quad detector 40. In a similar manner, measurements have shown that when astigmatic lens 36 is disposed at 75 degrees with respect to the major axis 18, the focus error signal is indicated by curve 55. The offset error is in the reverse direction as indicated by double-headed arrow 56. Accordingly, it is seen that even disposing the astigmatic optical element at precisely 45 degrees with respect to the axis 41 of quad detector 40 as taught in the prior art but not necessarily at 45° with respect to the major axis of an ovate light beam does not remove the offset errors 54, 56 required for high-areal density, optical data recording. The invention applies equally to reflective or transmissive record disks 11 and other optical targets.

It is preferred that astigmatic lens 36 be glued to detector 40, then the unit assembly of lens 36-detector 40 can be adjusted so that the lens 36 axis is disposed at 45° to major axis 18. Using this subassembly approach further reduces offset errors. For example, whenever the detector 40 inadvertently moves transversely with respect to axis 35 an offset error is introduced; i.e., the center of detector 40 which is the intersection of its two axes 41, 43 is not aligned. It has been found that if both lenses 36 and detector 40 move together, any resulting offset error is reduced.

While the invention has been particularly shown and described with reference to preferred embodiments thereof, it will be understood by those skilled in the art that various changes in form and details may be made therein without departing from the spirit and scope of the invention.

What is claimed is:

1. In an optical system, the improvement including, in combination:
    a light source having an ovate-shaped output light beam with a major axis;
    target means disposed to intercept the output light beam and modulating same in a manner to indicate degree of focus or out of focus at the target means interception of the output light beam;
    a focus detector disposed to receive said output light beam modulated by said target means for detecting the focus at said target means interception; and
    an astigmatic optical element having a first axis of astigmatism disposed at about 45 degrees with respect to said major axis and optically interposed between said focus detector and said target means.

2. In the optical system set forth in claim 1, wherein said target means is a record member having a record track with a length and said major axis being aligned with said track length.

3. In the optical system set forth in claim 1, wherein said astigmatic optical element is a hemicylinder lens elongated along said first axis of astigmatism.

4. In the optical system set forth in claim 1, wherein said focus detector includes a rectangular array of photo detectors and having an ordinate disposed at 45 degrees with respect to said first axis of astigmatism.

5. In the optical system set forth in claim 1, wherein said optical system is an optical data recorder and said target means is an optical record having a plurality of elongated recording areas for storing information-bearing signals;

said focus detector including a rectangular array of photodiodes having first and second crossed axes separating four of said photodiodes;

one of said crossed axes being aligned with said major axis; and said first crossed axis being aligned with the length of one of said recording areas.

6. In the optical system set forth in claim 5, further including a plurality of coupling optical elements for optically coupling said laser, said target means, said focus detector and said astigmatic optical element together such that the laser emitted light beam travels first to said target means and then through said astigmatic optical element to said focus detector, and wherein said light source is a solid-state laser for emitting an ovate-shaped light beam having an unknown ratio of major to minor axis lengths and all of said optical elements pass said ovate-shaped beam without circularizing same and said astigmatic optical element being optically interposed between said focus detector and said optical record.

7. In the optical system set forth in claim 6, further including, in combination:

data and tracking detector circuits electrically connected to said photodiodes for respectively detecting informational content contained in said one recording area and the relative radial position of said ovate light beam with respect to said one recording area.

8. In combination, an optical system having a plurality of serially optically-intercoupled optical elements for optically processing a light beam;

one of said optical elements introducing ovateness along a major axis into said light beam being processed which can introduce offset errors in said optical processing; and an astigmatic optical element being one of said optical elements disposed intermediate two of said intercoupled optical elements and having an astigmatic optical axis disposed at about 45 degrees with respect to said major axis for reducing said offset error in optical processing occurring subsequent to the light beam passing through said astigmatic optical element.

9. The optical system set forth in claim 8, further including, in combination:

an optically sensible record member disposed a predetermined distance from a second of said optical elements to intercept, modulate and retransmit said ovate light beam whereby said modulation includes an optically sensible indication of the relationship of said predetermined distance with respect to a desired distance between said record member and said second optical element, said indication being subject to said offset error.

10. The optical system set forth in claim 9, wherein said record member has an optically reflective layer for intercepting and modulating the intercepted ovate light beam and for retransmitting the intercepted ovate light beam by reflecting same to said one optical element, and said record member including a plurality of elongated record tracks for being optically scanned by said ovate light beam.

11. The optical system set forth in claim 10, wherein said first optical element is a laser optical element emitting an ovate shaped light beam;

a plurality of coupling optical elements including said second optical element being optically intercoupled to transmit said ovate light beam to said record member and receive the reflected ovate light beam from said record member and to direct the received reflected light beam to said astigmatic optical element; and a detector optical element disposed in juxtaposition to said astigmatic optical element for receiving said directed reflected ovate light beam.

12. The optical system set forth in claim 11, wherein said astigmatic optical element includes a hemicylinder lens having an astigmatic axis and being elongated along said astigmatic axis and disposed such that said major axis and said astigmatic axis subtend an angle of about 45 degrees.

13. The optical system set forth in claim 12, wherein said major axis is aligned with the length of a said record track being scanned by said ovate light beam.

14. The optical system set forth in claim 13, wherein said detector optical element includes a rectangular array of photodetectors and one dimension of said rectangular array being aligned with said major axis.

15. In an optical data recorder having a record disk having optically sensible signals recorded thereon and mounted for rotation about a rotation axis and having a reflective layer for said recorded optically sensible signals which are disposed in substantially concentric tracks on the disk and transducer means being radially-movably mounted with respect to said disk for sending a light beam to said reflective layer for scanning one of said tracks and for receiving the reflection of said sent light beam from said reflective layer;

said transducer means and said disk having a desired spacing therebetween;

the improvement including, in combination:

laser means in said transducer means for emitting an ovate-shaped light beam having a major axis aligned with said one track;

detector means in said transducer means having a rectangular array of photodetectors disposed for receiving said reflected light beam and having an array ordinate aligned with said major axis; and astigmatic optical means having an astigmatic axis disposed at about 45 degrees with respect to said major axis and disposed in optical communication with and being closely spaced from said detector means for intercepting said reflected light beam before such reflected light beam impinges on said photodetectors.

16. In the optical data recorder set forth in claim 15, wherein said astigmatic optical means includes a hemicylinder lens elongated along said astigmatic axis.

17. In a method of operating an optical data recorder having a record member with a plurality of elongated record tracks for recording optical sensible signals with an optical system having a laser light source for supplying a light beam to said record member and a detector for receiving a reflection of the supplied light beam for detecting the focus condition of the supplied light beam at said record member;

the steps of:

emitting a light beam to become said supplied light beam from said laser that has an elliptical cross section with a major axis optically aligned with the elongation of a track being scanned by said supplied light beam with the major axis of the supplied light beam being optically aligned with the elongation of said scanned record track;

intercepting said reflection with an astigmatic optical element that has an astigmatic axis disposed at about 45 degrees with respect to said major axis; and detecting the focus of said supplied light beam using a rectangular array of photodetectors disposed in juxtaposition to said astigmatic optical element and positioning said array so as to have an ordinate of the array optically aligned with said major axis.

* * * * *